US012745234B2

(12) United States Patent
Mukherjee et al.

(10) Patent No.: US 12,745,234 B2
(45) Date of Patent: Sep. 22, 2026

(54) ENHANCED COEXISTENCE IN MULTI LINK SCENARIOS OF WLAN PROTOCOLS

(71) Applicant: Cypress Semiconductor Corporation, San Jose, CA (US)

(72) Inventors: Suprojit Mukherjee, Nadia (IN); Sandeep Sarma Munukutla, Bangalore (IN); Raghavendra Kencharla, Bangalore (IN); Ayush Sood, Bengaluru (IN)

(73) Assignee: Cypress Semiconductor Corporation, San Jose, CA (US)

(*) Notice: Subject to any disclaimer, the term of this patent is extended or adjusted under 35 U.S.C. 154(b) by 425 days.

(21) Appl. No.: 18/475,425

(22) Filed: Sep. 27, 2023

(65) Prior Publication Data

US 2025/0106835 A1 Mar. 27, 2025

(51) Int. Cl.
*H04W 72/12* (2023.01)
*H04W 88/06* (2009.01)

(52) U.S. Cl.
CPC ........ *H04W 72/1215* (2013.01); *H04W 88/06* (2013.01)

(58) Field of Classification Search
CPC .. H04W 72/1215; H04W 88/06; H04W 84/12
See application file for complete search history.

(56) References Cited

U.S. PATENT DOCUMENTS

| | | | | |
|---|---|---|---|---|
| 2023/0053972 | A1* | 2/2023 | Patil | H04W 76/15 |
| 2024/0179765 | A1* | 5/2024 | Soma | H04W 76/10 |
| 2024/0373242 | A1* | 11/2024 | Nayak | H04W 16/14 |
| 2025/0039915 | A1* | 1/2025 | Lou | H04W 72/542 |

* cited by examiner

*Primary Examiner* — Shawn D Miller

(57) ABSTRACT

A system and method for improving coexistence of multilink devices using WLAN protocols. The method includes operating, by a processing device, a first radio of a plurality of radios of a multi-link (ML) device to communicate on a first frequency band with a networking device. The method includes determining a future time interval for a different radio of a communication device to communicate in the first frequency band. The method includes determining a potential interference or an actual interference between the first radio of the plurality of radios and the different radio based on the future time interval of the different radio. The method includes preventing the first radio from communicating in the first frequency during one or more portions of the future time interval to reduce the potential interference or the actual interference.

30 Claims, 4 Drawing Sheets

ENHANCED COEXISTENCE IN MULTI LINK SCENARIOS OF WLAN PROTOCOLS

TECHNICAL FIELD

The present disclosure relates generally to the field of wireless telecommunications, and more particularly, to enhanced systems and methods for improving coexistence of multilink devices using WLAN protocols.

BACKGROUND

Wireless devices use a variety of different wireless technologies to access wireless networks. This creates situations where multiple wireless technologies coexist in the same frequency band. For example, there may be a coexistence of WiFi and Bluetooth (BT) in the 2G frequency band, a coexistence of ultra-wideband (UWB) and WiFi in the 6G frequency band, or a coexistence of the same technologies in the same band. The coexistence of multiple wireless technologies in the same frequency band increases the radio frequency (RF) interference within the frequency band, making it more difficult for wireless devices to communicate.

BRIEF DESCRIPTION OF THE DRAWINGS

The present disclosure is illustrated by way of example, and not by way of limitation, in the figures of the accompanying drawings in which like reference numerals refer to similar elements and in which.

DETAILED DESCRIPTION

Figure 1:
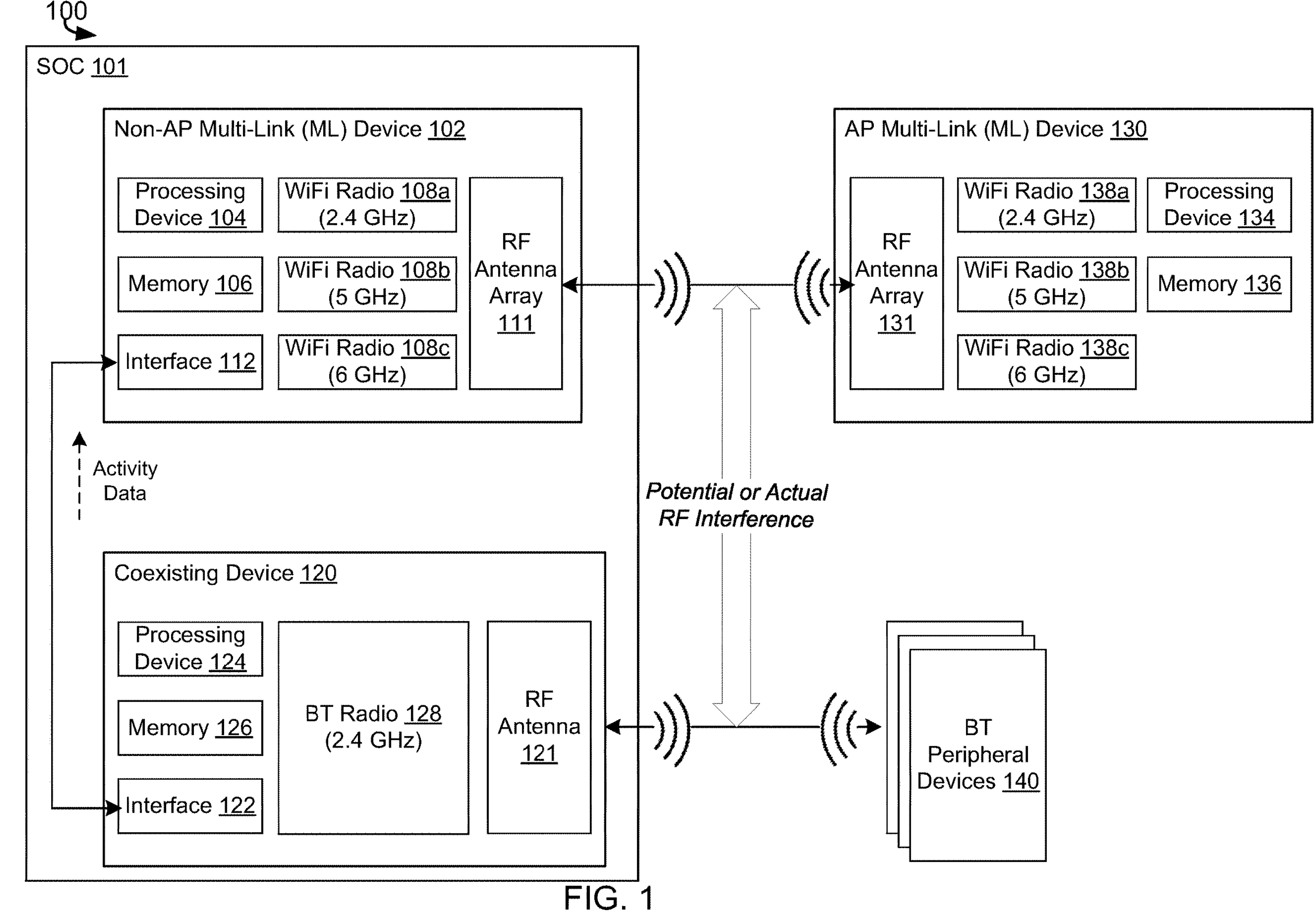
FIG. 1 illustrates a block diagram of an example environment for improving coexistence of multilink devices using WLAN protocols, according to some embodiments.

The following description sets forth numerous specific details such as examples of specific systems, components, methods, and so forth, in order to provide a good understanding of various embodiments of the techniques described herein for improving the accuracy of location measurements, for example using secure phase-based ranging procedures and Direction Finding (DF) procedures for determining the location of wireless devices. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the scope of the present disclosure.

The WiFi 7 (802.11be) standard has introduced the concept of Multi-Link Operation (MLO) that enables wireless devices connected to a WiFi access point (AP), such as a router, to simultaneously communicate (e.g., send and/or receive) data across different frequency bands and channels. This feature enhances the user experience by increasing throughput, reducing latency, and improving reliability of the wireless communication. In contrast, a wireless device that uses an older generation of the WiFi standard, such as WiFi 6 and WiFi 5, can only connect to a single WiFi band at a time, either the 2.4 GHz (gigahertz, $1\times10^{9}$) band or the 5 GHz band. While the WiFi 6E technology does expand the wireless device's connection capability to also include the 6 GHz band, the wireless device is still unable to connect with multiple WiFi bands at the same time.

Although the MLO feature of WiFi 7 provides several advantages (e.g., increased, etc.), it does come with an extra expense. That is, the coexistence of multiple wireless technologies in the same frequency band can increase the RF interference within the frequency band, which in turn, degrades the performance of the wireless devices that are using the frequency band to communicate.

The RF designers of the conventional wireless devices use various techniques to increase the isolation between the devices and their antennas to minimize the interference. However, aside from the high cost implications, these isolation techniques fail to adequately reduce the interference when two coexisting technologies, such as WiFi and BT, are simultaneously operating in parallel on the same System-on-Chip (SOC). For example, an SOC that is built onto the same semiconductor device could include a coexisting device for communicating BT signals and a WiFi device for communicating WiFi signals. Furthermore, even if the RF designer could achieve enough isolation between the wireless technologies, they still might need to use RF de-sensing techniques on the gain levels of the RF front-end elements of the radio to avoid saturation of the radio. De-sensing the front-end, however, might not be the best option because it can degrade the communication range of the wireless device.

Alternatively, two coexisting technologies can safely operate in the same frequency band without interfering with one another if they use time division multiplexing (TDM). For example, an RF system (e.g., SOC) could only allow its WiFi radio to use a particular frequency band when its BT radio is not using the same frequency band. However, this is also not a practical option because it increases latency and degrades the overall throughput of the channels. Thus, there is a long-felt but unsolved need to solve the problems of allowing the coexistence of multiple wireless technologies in the same frequency band without causing a degradation in the performance of the wireless devices that are using the frequency band.

Aspects of the disclosure address the above-noted and other deficiencies by disclosing enhanced systems and methods for improving coexistence of multilink devices using WLAN protocols. Benefits of the embodiments of the present disclosure include increased throughput, reduced latency, and improved reliability for multi-link (ML) devices that are operating in the same frequency using the same or different wireless technologies.

As described in the below passages, a non-access point (AP) ML device includes a plurality of radios that provide a plurality of communication links (e.g., connections) to an AP ML device (e.g., router) using a plurality of frequency bands. That is, each radio of the non-AP device is configured to communicate over one of the frequency bands (e.g., 2.4 GHz, 5 GHz, or 6 GHz) of the plurality of frequency bands using WiFi technology. A coexisting device includes its own radio that is also configured to communicate over the same 2.4 GHz frequency, but using BT technology instead of WiFi technology. Both radios can communicate over the same 2.4 GHz frequency band because the RF system reduces the gains of their front-end elements to prevent them from saturating. However, if a received signal strength indicator (RSSI) of either the non-AP ML device or the coexisting device drops below their respective predetermined values (e.g., R1, R2), then the non-AP ML device causes its 2.4 GHz radio to enter a low-power consumption state (e.g., sleep state or powered-down state) and switches to one of its other radios (e.g., 5 GHz or 6 GHz) to continue communicating with the AP ML device. A sleep state, for example, may be where a processing device of the non-AP ML device causes one or more portions (e.g., radios, timers, and/or clocks) of the non-AP ML device to consume less power (as compared to when in an active state), or to cause the one or more portions to power-down. When the non-AP ML device detects that the coexisting device's activity on the 2.4 GHz is complete, the non-AP ML device wakes its 2.4 GHz radio from its low-power state to resume the communication, as decided by the AP ML device.

Furthermore, in some embodiments, the non-AP ML device may decide to not cause its 2.4 GHz radio to enter a low-power consumption state and/or switch from the 2.4 GHz radio to one of its other radios even though the non-AP ML device determined that the RSSI of either the non-AP ML device or the coexisting device dropped below their respective predetermined values. For example, the non-AP ML device may determine that the coexisting device will transmit in the 2.4 GHz frequency band for a particular duration, referred to a traffic duration. The non-AP ML device may also determine that there is a switching duration to switch from one radio to another. If the traffic duration is less than twice the switching duration, then the non-AP ML device may determine to not take a remedial action (e.g., enter low-power state and switch radios) to prevent the interference because the benefit of reducing the interference is negligible compared to the disadvantages of introducing the excess switching latency into the system. Yet, if the traffic duration is greater than twice the switching duration, then the non-AP ML device may determine to implement the remedial action (e.g., enter low-power state and switch radios) to prevent the interference.

In an illustrative embodiment, a non-AP ML device may operate a first radio (e.g., WiFi radio) of its plurality of radios to communicate on a first frequency band (e.g., 2.4 GHz) with a networking device, such as a router. The non-AP ML device may determine a future time interval (e.g., a 1-second window that begins 2 seconds from now) for a different radio (e.g., coexisting device) of a communication device to communicate in or on (both which mean the same) the first frequency band. The non-AP ML device may determine a potential interference or an actual interference between the first radio of the plurality of radios and the different radio based on the future time interval of the different radio. The potential interference is an interference that has not yet (if ever) occurred, while an actual interference is an interference that is occurring. The non-AP ML device may prevent the first radio from communicating on the first frequency band during one or more portions of the future time interval to reduce the potential interference or the actual interference.

FIG. 1 illustrates a block diagram of an example environment for improving coexistence of multilink devices using WLAN protocols, according to some embodiments. The environment 100 includes a System-On-Chip (SOC) 101 and an access point (AP) ML device 130 that are within communication range of one another. The SOC 101 (e.g., smartphone, laptop, etc.) includes a non-AP ML device 102 (e.g., a WiFi module) and a coexisting device 120 (e.g., a BT device) that are each installed on the same semiconductor substrate (e.g., silicon). Alternatively, in some embodiments, the non-AP ML device 102 and the coexisting device 120 are not included within the same SOC, but instead, are installed on two different (separate) devices. The environment 100 includes one or more BT peripheral devices 140 (e.g., smart phones, laptops) that are within communication range of the SOC 101.

The non-AP ML device 102 (e.g., a WiFi module or an ML device) includes a processing device 104. The non-AP ML device 102 includes a memory 106 that is coupled to the processing device 104 for storing instructions (including temporary data) that are executed by the processing device 104. The non-AP ML device 102 includes a plurality of WiFi radios 108. For example, the non-AP ML device 102 includes WiFi radio 108*a* that is configured to communicate (e.g., transmit, receive) in the 2.4 GHz frequency band, a WiFi radio 108*b* that is configured to communicate in the 5 GHz frequency band, and a WiFi radio 108*c* that is configured to communicate in the 6 GHz frequency band.

The non-AP ML device 102 includes an RF antenna array 111 that includes a plurality of antennas that are each tuned to 2.4 GHz, 5 GHz, or 6 GHz; respectively. The non-AP ML device 102 includes an interface 112 that is configured to receive activity data (e.g., statistics, traffic data) that indicates when there will be a future transmission by the BT peripheral devices 140 on the 2.4 GHz frequency band to the coexisting device 120 and/or a future transmission by the coexisting device 120 to one or more BT peripheral devices 140.

The AP ML device 102 (e.g., router) includes a processing device 134. The AP ML device 130 includes a memory 136 that is coupled to the processing device 134 for storing instructions (including temporary data) that are executed by the processing device 134. The AP ML device 130 includes a plurality of WiFi radios 138. For example, the AP ML device 130 includes WiFi radio 138*a* that is configured to communicate in the 2.4 GHz frequency band, a WiFi radio 138*b* that is configured to communicate in the 5 GHz frequency band, and a WiFi radio 138*c* that is configured to communicate in the 6 GHz frequency band. The AP ML device 130 includes an RF antenna array 131 that includes a plurality of antennas that are each tuned to 2.4 GHz, 5 GHz, or 6 GHz; respectively.

A radio that supports WiFi communication may support any WiFi standard, including the WiFi 7 (802.11be) standard. A radio that supports Bluetooth communication may support any Bluetooth (802.15.1) standard, including the Bluetooth Low Energy standard.

The coexisting device 120 includes a processing device 124. The coexisting device 120 includes a memory 126 that is coupled to the processing device 124 for storing instructions (including temporary data) that are executed by the processing device 124. The coexisting device 120 includes a BT radio 128 that is configured to communicate in the 2.4 GHz frequency band using BT technology. The coexisting device 120 includes an RF antenna 121 that is tuned to 2.4 GHz. The coexisting device 120 includes an interface 122 that is configured to transmit activity data (e.g., statistics, traffic data) to the non-AP ML device 102, where the activity data indicates when there will be a future transmission by the BT peripheral devices 140 on the 2.4 GHz frequency band to the coexisting device 120 and/or a future transmission by the coexisting device 120 to the one or more BT peripheral devices 140 on the 2.4 GHz frequency band.

The non-AP ML device 102 is configured to connect to the AP ML device 130 using RF communication. For example, the non-AP ML device 102 may use its WiFi radio 108*a* to connect to the WiFi radio 138*a* of the AP ML device 130 in the 2.4 GHz frequency band. The non-AP ML device 102 may use its WiFi radio 108*b* to connect to the WiFi radio 138*b* of the AP ML device 130 in the 5 GHz frequency band. The non-AP ML device 102 may use its WiFi radio 108*c* to connect to the WiFi radio 138*c* of the AP ML device 130 in the 6 GHz frequency band.

The coexisting device 120 is configured to connect to one or more BT peripheral devices 140 using RF communication. For example, the coexisting device 120 may use its BT radio 128 to communicate with one or more BT peripheral devices 140 in the 2.4 GHz frequency band.

The RF communication between the non-AP ML device 102 and the AP ML device 130 on the 2.4 GHz frequency band may interfere with, and degrade, the RF communication between the coexisting device 120 and the one or more BT peripheral devices 140 on the same 2.4 GHz frequency band. Likewise, the RF communication between the one or more BT peripheral devices 140 and the AP ML device 130 on the 2.4 GHz frequency band may interfere with, and degrade, the RF communication between coexisting device 120 and the non-AP ML device 102 on the same 2.4 GHz frequency band. Conversely, there is no interference between the non-AP ML device 102 and the coexisting device 120 when the non-AP ML device 102 causes its WiFi radio 108*a* to go to sleep (or power down), even if the AP ML device 130 continues to communicate on the 5 GHz and/or 6 GHz frequency bands using its WiFi radios 108*b,c*.

RF interference can degrade the performance of a radio by, for example, degrading the sensitivity of the radio to receive and decode packets and/or transmit messages to another device that can be understood by the other device.

An actual interference in FIG. 1 refers to an interference that has occurred in the past or is currently occurring. A potential interference refers to a future RF interference that has not yet occurred but, might occur in the future unless evasive action (e.g., switching radios, switching frequencies, reducing gain of front-end elements of a radio) is taken by the SOC 101.

Still referring to FIG. 1, the non-AP ML device 102 may operate the WiFi radio 108*a* (sometimes referred to as a first radio) of its plurality of radios to communicate on the 2.4 GHz frequency band (sometimes referred to as a first frequency band) with the AP ML device 130 (sometimes referred to as a networking device). The non-AP ML device 102 may determine a future time interval for BT radio 128 (sometimes referred to as a different radio) of a coexisting device 120 (sometimes referred to as a communication device) to communicate on the 2.4 GHz frequency band. The non-AP ML device 102 may determine a potential interference or an actual interference between the WiFi radio 108*a* of the plurality of radios and the BT radio 128 based on the future time interval of the BT radio 125. The non-AP ML device 102 may prevent the WiFi radio 108*a* from communicating on the 2.4 GHz frequency band during one or more portions (e.g., timeslots) of the future time interval to reduce the potential interference or the actual interference.

The non-AP ML device 102 may receive, from the coexisting device 120 via the interface 112 (sometimes referred as a non-RF interface), activity data indicative of a future transmission by the coexisting device 120 on the 2.4 GHz frequency band. The non-AP ML device 102 may determine the future time interval for the BT radio 128 of the coexisting device 120 to communicate on the 2.4 GHz frequency band based on the activity data.

The non-AP ML device 102 may simultaneously transmit on the 2.4 GHz frequency band while the coexisting device 120 is transmitting on the 2.4 GHz frequency band. For example, the non-AP ML device 102 may determine that a first received signal strength indicator (RSSI) of the WiFi radio 108*a* is greater than a first predetermined threshold value and a second RSSI of the BT radio 128 is greater than a second predetermined threshold value while the WiFi radio 108*a* and the BT radio 128 are simultaneously communicating on the 2.4 GHz frequency band. In response, the non-AP ML device 102 may continue to simultaneously transmit on the 2.4 GHz frequency band while the coexisting device 120 is transmitting on the 2.4 GHz frequency band because the non-AP ML device 102 determined that the interference (if any) between the two devices is not degrading their performance. The first RSSI of the WiFi radio 108*a* and the second RSSI of the BT radio 128 may be the same value or different values.

However, the non-AP ML device 102 may determine that there is an actual interference caused by the simultaneously transmission of the non-AP ML device 102 and the coexisting device 120. For example, the non-AP ML device 102 may determine that the first RSSI of the WiFi radio 108*a* is less than a first predetermined threshold value and/or the second RSSI of the BT radio 128 is less than a second predetermined threshold value while the WiFi radio 108*a* and the BT radio 128 are simultaneously communicating on the 2.4 GHz frequency band.

The non-AP ML device 102 may prevent the WiFi radio 108*a* from communicating on the 2.4 GHz frequency band during the one or more portions (or all portions) of the future time interval to avoid the potential interference or reduce (or eliminate) the actual interference by switching (e.g., toggling) the WiFi radio 108*a* from an active state to a sleep state to stop the WiFi radio 108*a* from communicating on the 2.4 GHz frequency band with the AP ML device 130. The non-AP ML device 102 may operate one or both of its other radios (e.g., WiFi radio 108*b* and/or WiFi radio 108*c*) to resume the communication with the AP ML device 130 on the other frequency bands (e.g., 5 GHz and/or 6 GHz) that do not interfere with the 2.4 GHz frequency band.

In some embodiments, the non-AP ML device 102 may switch the WiFi radio 108*a* from the active state to a power-down state, instead of the sleep state, to further reduce the overall power consumption of the non-AP ML device 102. A sleep state, for example, may be where the processing device 104 of the non-AP ML device causes one or more portions (e.g., radios, timers, and/or clocks) of the non-AP ML device to consume less power (as compared to when in an active state), or to cause the one or more portions to power-down.

The non-AP ML device 102 may use its WiFi radio 108*a* to send, to the AP ML device 130, a message indicating that the non-AP ML device 102 is switching from the 2.4 GHz frequency band to one or more of the other frequency bands. In some embodiments, the message may cause the AP ML device 130 to switch to the different frequency bands (e.g., 5 GHz and/or 6 GHz) to continue communicating with the non-AP ML device 102. In some embodiments, the message may further include a power mode (PM) bit that is set to '1' to indicate to the AP ML device 130 that the WiFi radio 108*a* of the non-AP ML device 102 is now entering a sleep state or a power-down state for a particular period of time (e.g., a time between 10 microseconds (us) to 100 milliseconds (ms)).

The non-AP ML device 102 may determine that an actual interference between the non-AP ML device 102 and coexisting device 120 is no longer present by determining that the first RSSI of the WiFi radio 108*a* is greater than the first predetermined threshold value and the second RSSI of the BT radio 128 is greater than the second predetermined threshold value. In response, the non-AP ML device 102 may use its WiFi radio 108*b* or WiFi radio 108*c* to send, to the AP ML device 130, an additional message indicating that the non-AP ML device 102 is switching back to the 2.4 GHz frequency band. In some embodiments, the message may cause the AP ML device 130 to switch back to the 2.4 GHz frequency band to continue communicating with the non-AP ML device 102. In some embodiments, the additional message may further include a PM bit that is set to '0' to indicate to the AP ML device 130 that the WiFi radio 108*a* of the non-AP ML device 102 has entered the active state from the sleep state or the power-down state.

In some embodiments, the non-AP ML device 102 may decide to not cause its 2.4 GHz radio to enter a low-power consumption state and/or switch from the 2.4 GHz radio to one of its other radios even though the non-AP ML device 102 determined that the RSSI of either the non-AP ML device 102 or the coexisting device dropped below their respective predetermined values. For example, the non-AP ML device 102 may determine that the coexisting device will transmit in the 2.4 GHz frequency band for a particular duration, referred to a traffic duration. The non-AP ML device 102 may also determine that there is a switching duration to switch from one radio to another. If the traffic duration is less than twice the switching duration, then the non-AP ML device 102 may determine to not take a remedial action (e.g., enter low-power state and switch radios) to prevent the interference because the benefit of reducing the interference is negligible compared to the disadvantages of introducing the excess switching latency into the system. Yet, if the traffic duration is greater than twice the switching duration, then the non-AP ML device may determine to implement the remedial action (e.g., enter low-power state and switch radios) to prevent the interference.

Figure 2:
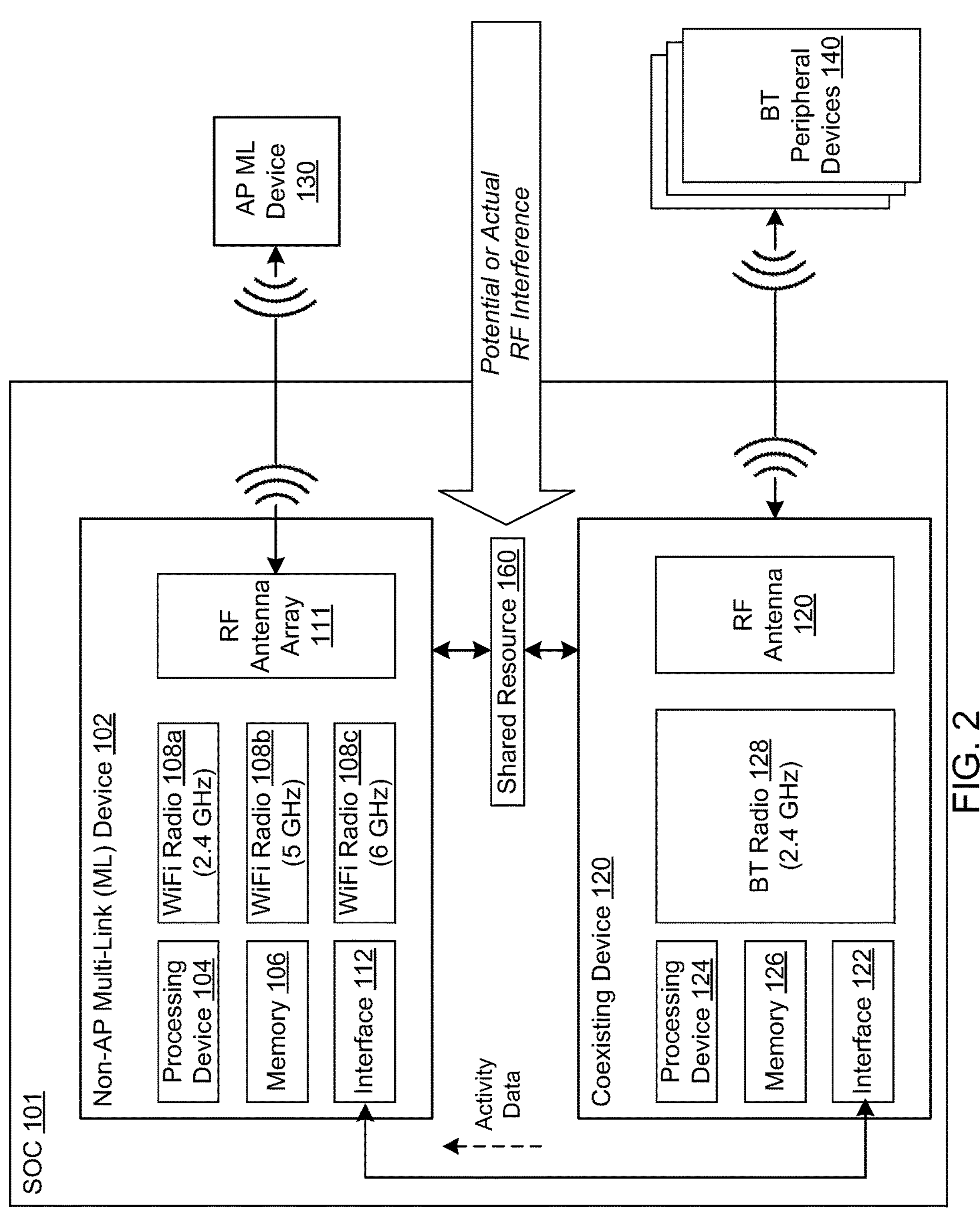
FIG. 2 illustrates a variation of the example environment in FIG. 1, according to some embodiments.

FIG. 2 illustrates a variation the example environment in FIG. 1, according to some embodiments. The environment 200 shows that that the SOC 101 may include shared resources 160 that are coupled between the outputs of one of more of the radios (e.g., WiFi radio 108*a*, WiFi radio 108*b*, WiFi radio 108*c*) of the non-AP ML device 102 and the BT radio 128 of the coexisting device 120. A shared resource may include, for example, a power amplifier, a transimpedance amplifier (TIA), an antenna, a coupler, a transmit/receive (Tx/Rx) path, memory, a processing device, and/or the like.

A potential interference or actual interference may also take place at the location of the shared resources 160 when the WiFi radio 108*a* of the non-AP ML device 102 and the BT radio 128 of the coexisting device 120 are simultaneously transmitting on the 2.4 GHz frequency band.

The non-AP ML device 102 may determine a potential interference between the non-AP ML device 102 and the coexisting device 120. For example, the non-AP ML device 102 may determine a future time interval for the WiFi radio 108*a* of the non-AP ML device 102 to communicate on the 2.4 GHz frequency band and a future time interval for the BT radio 128 of the coexisting device 120 to communicate on the 2.4 GHz frequency band. The non-AP ML device 102 may determine, based on the future time intervals, that there will be a partial or complete overlap of the future time interval for the WiFi radio 108*a* and the future time interval for the BT radio 128. The non-AP ML device 102 may determine that this partial or complete overlap of when the two radios are communicating on the 2.4 GHz frequency band will degrade the performance of the non-AP ML device 102 and/or the coexisting device.

Figure 3:
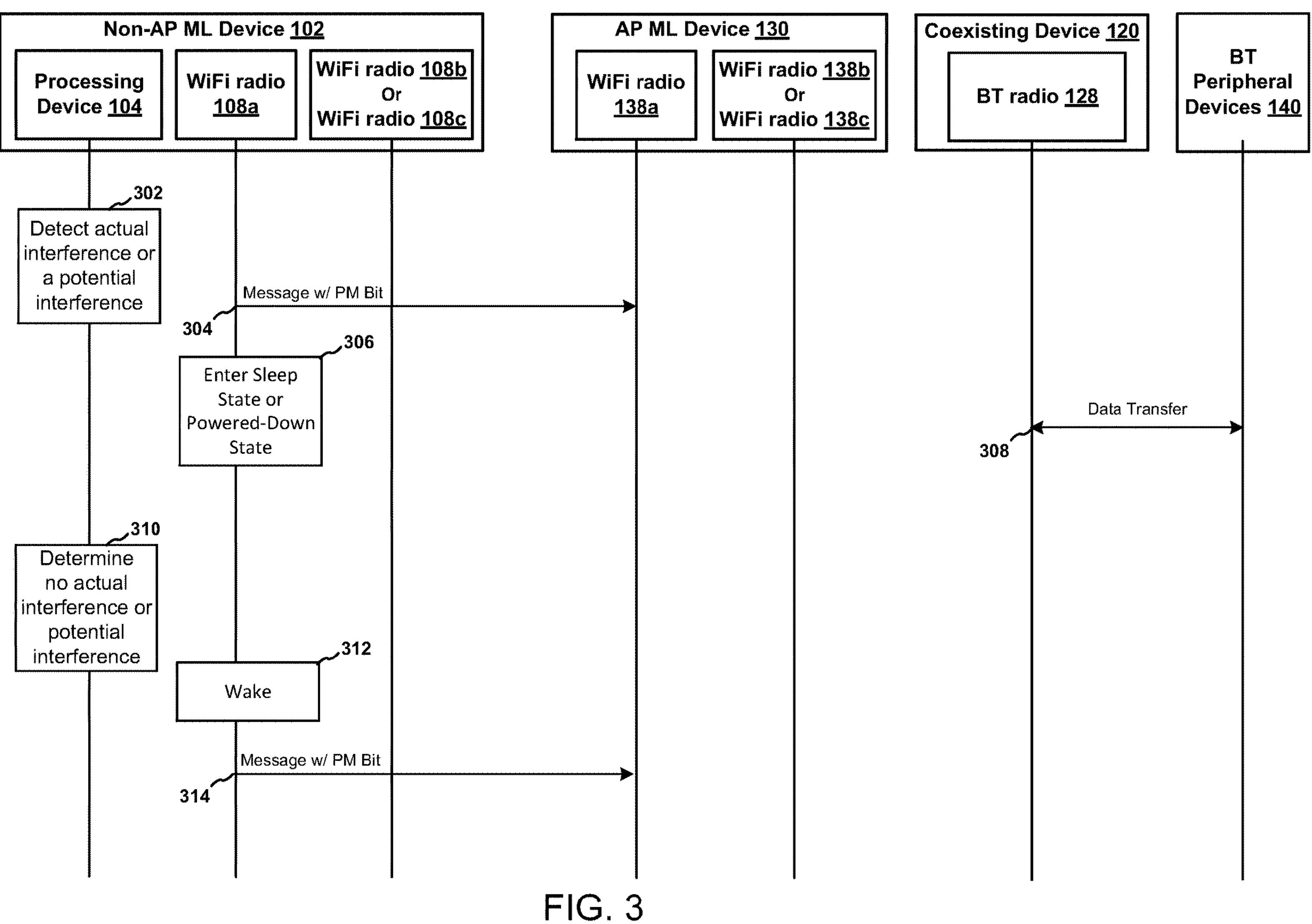
FIG. 3 illustrates a timing diagram for the SOC 101 in FIG. 1 and FIG. 2, according to some embodiments.

FIG. 3 illustrates a timing diagram for the SOC 101 in FIG. 1 and FIG. 2, according to some embodiments. The timing 300 diagram shows the signals and operations of the non-AP ML device 102 (including its processing device 104, WiFi radio 108*a*, WiFi radio 108*b*, and WiFi radio 108*c*), AP ML device 130 (including its WiFi radio 138*a*, WiFi radio 138*b*, and WiFi radio 138*c*), coexisting device 120 (including its BT radio 128), and BT peripheral devices 140.

At operation 302, the processing device 104 of the non-AP ML device 102 detects that there is an actual interference or a potential interference between the non-AP ML device 102 and the coexisting device 120. This interference can degrade the ability for the coexisting device 120 to perform a data transfer with BT peripheral devices 140.

At operation 304, the WiFi radio 108*a* of the non-AP ML device 102 sends a message to the WiFi radio 138*a* of the AP ML device 130. The message includes a PM bit set to '1' to indicate to the AP ML device 130 that the non-AP ML device 102 will now enter a sleep state or power down state, which in turn, causes the AP ML device 130 to stop communicating with the non-AP ML device 102 using its WiFi radio 138*a*.

At operation 306, the WiFi radio 108*a* enters a sleep state or powered-down state.

At operation 308, the BT radio 128 of the coexisting device 120 begins transferring data with the one of more BT peripheral devices 140. That is, the non-AP ML device 102 adjusts the time window for using its WiFi radio 108*a* to communicate with other devices, so to allow the coexisting device 120 to freely communicate at any time with the other devices. Thus, the non-AP ML device 102 was able to avoid a potential interference or stop an actual interference between the non-AP ML device 102 and the coexisting device 120 by preventing the WiFi radio 108*a* of the non-AP ML device 102 and the WiFi radio 138*a* of the AP ML device 130 from communicating with each other.

At operation 310, the processing device 104 of the non-AP ML device 102 determines that there is no longer an actual interference or a potential interference between the non-AP ML device 102 and the coexisting device 120.

At operation 312, the WiFi radio 108*a* wakes from the sleep state or powered-down state because there is no longer an actual interference or a potential interference between the non-AP ML device 102 and the coexisting device 120; and thus, their communication with each other will not degrade the ability for the coexisting device 120 to perform a data transfer with BT peripheral devices 140.

At operation 314, the WiFi radio 108*a* of the non-AP ML device 102 sends a message to the WiFi radio 138*a* of the AP ML device 130. The message includes a PM bit set to '0' to indicate to the AP ML device 130 that the WiFi radio 108*a* is no longer asleep, which in turn, allows the WiFi radio 138*a* of the AP ML device 130 to freely communicate with the non-AP ML device 102. It should be noted that the other radios (e.g., WiFi radio 108*b*, WiFi radio 108*c*) of the non-AP ML device 102 are free to communicate with the AP ML device 130 on the other frequency bands (e.g., 5 GHz, 6 GHz) even though the BT radio 128 might be actively communicating with the one or more BT peripheral devices 140 on the 2.4 GHz frequency band because there is no interference between the different frequency bands.

Figure 4:
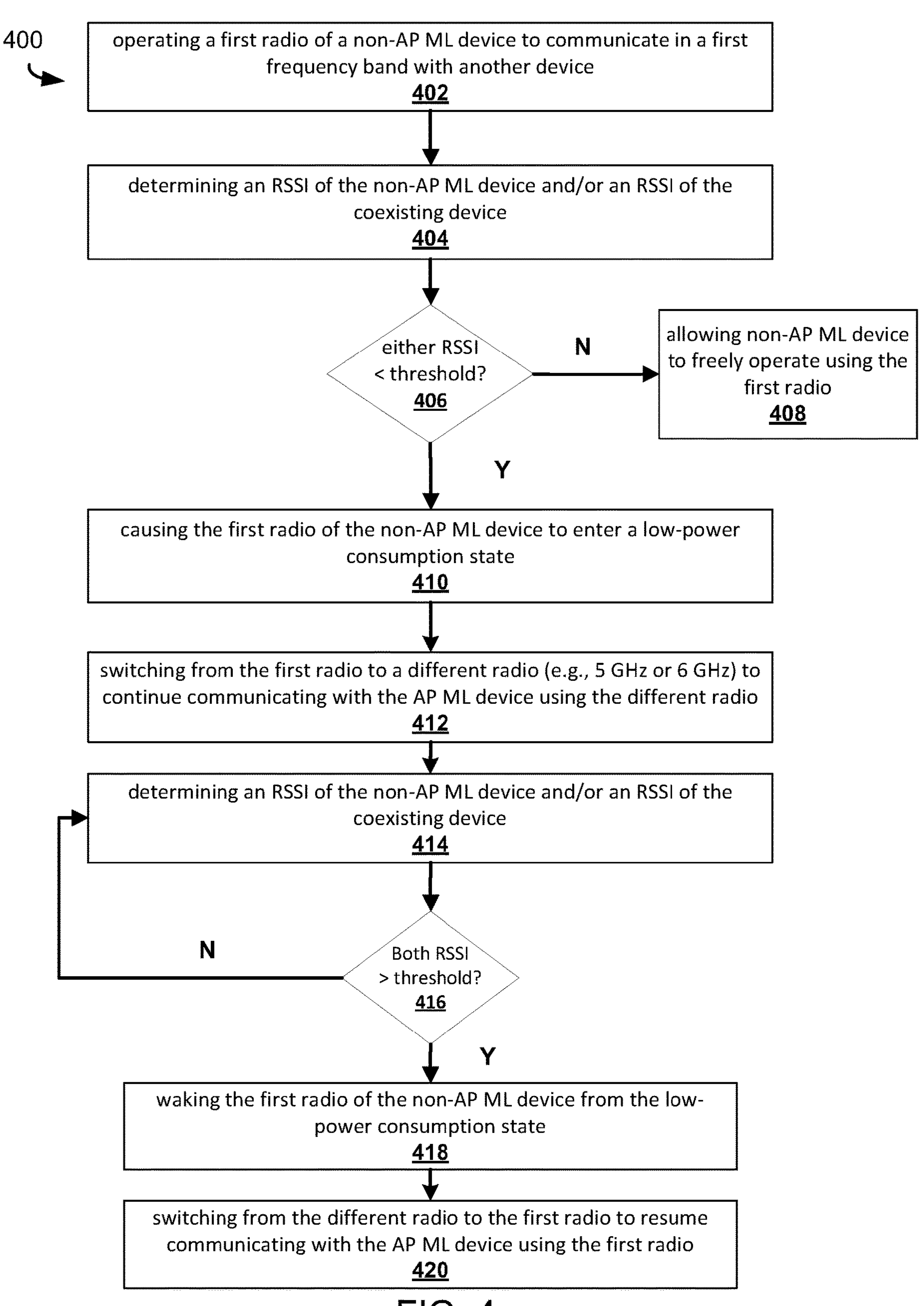
FIG. 4 is a flow diagram of a method for improving the coexistence of multilink devices using WLAN protocols, according to some embodiments.

FIG. 4 is a flow diagram of a method for improving coexistence of multilink devices using WLAN protocols, according to some embodiments. Although the operations are depicted in FIG. 4 as integral operations in a particular order for purposes of illustration, in other implementations, one or more operations, or portions thereof, are performed in a different order, or overlapping in time, in series or parallel, or are omitted, or one or more additional operations are added, or the method is changed in some combination of ways. In some embodiments, the method 400 may be performed by processing logic that comprises hardware (e.g., circuitry, dedicated logic, programmable logic, microcode, etc.), firmware, or a combination thereof. In some embodiments, some or all operations of method 400 may be performed by one or more components (e.g., non-AP ML device 102, coexisting device 120) of the SOC 101 in FIG. 1.

The method 400, in some embodiments, includes the operation 402 of operating a first radio (e.g., WiFi radio 108*a*) of the non-AP ML device 102 to communicate in a first frequency band with another device.

The method 400, in some embodiments, includes the operation 404 of determining an RSSI of the non-AP ML device 102 and/or an RSSI of the coexisting device 120 to determine the existence of interference between the non-AP ML device 102 and the coexisting device 120. For example, the non-AP ML device 102 can calculate (e.g., measure) an RSSI value based on signals that are received at the RF antenna array 111. Similarly, the coexisting device 120 can measure an RSSI value based on signals received at the RF antenna 121 and send the RSSI value to the non-AP ML device 102.

The method 400, in some embodiments, includes the operation 406 of comparing the RSSI of the non-AP ML device 102 and/or the RSSI of the coexisting device to a predetermined threshold value. If both RSSI values are greater than the predetermined threshold value, then the non-AP ML device 102 advances to operation 408 of allowing the non-AP ML device 102 to freely operate using the first radio.

However, if the RSSI value of either the non-AP ML device 102 or the coexisting device drops below the predetermined value, then the non-AP ML device 102 advances to operation 410 of causing the first radio of the non-AP ML device 102 to enter a low-power consumption state (e.g., a sleep state or powered-down state).

The method 400, in some embodiments, includes the operation 412 of switching from the first radio to a different radio (e.g., WiFi radio 108*b* or WiFi radio 108*c*) to continue communicating with the other device using the different radio.

The method 400, in some embodiments, includes the operation 414 of determining an RSSI of the non-AP ML device 102 and/or an RSSI of the coexisting device 120.

The method 400, in some embodiments, includes the operation 416 of comparing the RSSI of the non-AP ML device 102 and/or the RSSI of the coexisting device to a predetermined threshold value. If the RSSI values of either the non-AP ML device 102 or the coexisting device are still below the predetermined value, then the non-AP ML device 102 advances to operation 414 to recheck (e.g., poll) the RSSI values.

However, if both RSSI values are greater than the predetermined threshold value, then the non-AP ML device 102 determines that the interference no longer exists and advances to operation 418.

The method 400, in some embodiments, includes the operation 418 of waking the first radio of the non-AP ML device 102 from the low-power consumption state.

The method 400, in some embodiments, includes the operation 420 of switching from the different radio to the first radio to resume communicating with the AP ML device using the first radio.

In the above description, some portions of the detailed description are presented in terms of algorithms and symbolic representations of operations on analog signals and/or digital signals or data bits within a non-transitory storage medium. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the disclosure. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "operating," "determining," "preventing," "sending," "receiving," "generating," "switching," or the like, refer to the actions and processes of an integrated circuit (IC) controller, or similar electronic device, that manipulates and transforms data represented as physical (e.g., electronic) quantities within the controller's registers and memories into other data similarly represented as physical quantities within the controller memories or registers or other such information non-transitory storage medium.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term “or” is intended to mean an inclusive “or” rather than an exclusive “or.” That is, unless specified otherwise, or clear from context, “X includes A or B” is intended to mean any of the natural inclusive permutations. That is, if X includes A; X includes B; or X includes both A and B, then “X includes A or B” is satisfied under any of the foregoing instances. In addition, the articles “a” and “an” as used in this application and the appended claims should generally be construed to mean “one or more” unless specified otherwise or clear from context to be directed to a singular form. Moreover, use of the term “an embodiment” or “one embodiment” or “an embodiment” or “one embodiment” throughout is not intended to mean the same embodiment or embodiment unless described as such.

Embodiments described herein may also relate to an apparatus (e.g., such as an AC-DC converter, and/or an ESD protection system/circuit) for performing the operations herein. This apparatus may be specially constructed for the required purposes, or it may comprise firmware or hardware logic selectively activated or reconfigured by the apparatus. Such firmware may be stored in a non-transitory computer-readable storage medium, such as, but not limited to, read-only memories (ROMs), random access memories (RAMs), EPROMS, EEPROMs, flash memory, or any type of media suitable for storing electronic instructions. The term “computer-readable storage medium” should be taken to include a single medium or multiple media that store one or more sets of instructions. The term “computer-readable medium” shall also be taken to include any medium that is capable of storing, encoding, or carrying a set of instructions for execution by the machine and that causes the machine to perform any one or more of the methodologies of the present embodiments. The term “computer-readable storage medium” shall accordingly be taken to include, but not be limited to, solid-state memories, optical media, magnetic media, any medium that is capable of storing a set of instructions for execution by the machine and that causes the machine to perform any one or more of the methodologies of the present embodiments.

The above description sets forth numerous specific details such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:

operating, by a processing device, a first radio of a plurality of radios of a multi-link (ML) device to communicate in a first frequency band with a networking device;

determining a future time interval for a different radio of a communication device to communicate in the first frequency band;

determining a potential interference or an actual interference between the first radio of the plurality of radios and the different radio based on the future time interval of the different radio;

preventing the first radio from communicating in the first frequency band during one or more portions of the future time interval to reduce the potential interference or the actual interference;

determining a second potential interference or a second actual interference between the first radio of the plurality of radios and the different radio based on a second future time interval of the different radio;

determining whether the second future time interval is less than or greater than a switching time to switch from the first radio of the plurality of radios to a second radio of the plurality of radios; and either:

switching from the first radio to the second radio responsive to determining that the second future time interval is greater than the switching time, or preventing the switching from the first radio to the second radio responsive to determining that the second future time interval is less than the switching time.

2. The method of claim 1, further comprising:

receiving, by the processing device from the communication device, activity data indicative of at least one of a future transmission by the communication device in the first frequency band, wherein determining the future timing interval is further based on the activity data.

3. The method of claim 1, wherein the first radio of the plurality of radios and the different radio are each coupled to a shared resource for communicating in the first frequency band, and wherein determining the potential interference comprises:

determining a future time interval for the first radio of the ML device to communicate in the first frequency band; and determining a partial or complete overlap of the future time interval for the first radio and the future time interval for the communication device.

4. The method of claim 1, wherein the first radio of the plurality of radios of the ML device and the different radio of the communication device are simultaneously communicating in the first frequency band.

5. The method of claim 1, wherein determining the actual interference comprises:

determining that at least one of a first received signal strength indicator (RSSI) of the first radio is less than a first predetermined threshold value or a second RSSI of the different radio is less than a second predetermined threshold value while the first radio and the different radio are simultaneously communicating in the first frequency band.

6. The method of claim 5, further comprising:

determining that the actual interference is no longer present by determining that the first RSSI of the first radio is greater than the first predetermined threshold value and the second RSSI of the different radio is greater than the second predetermined threshold value;

switching the first radio from a low-power state to an active state; and operating the first radio to send, to the networking device, an additional message indicating that the ML device is switching from a second frequency band to the first frequency band, wherein the additional message causes the networking device to communicate with the ML device in the first frequency band.

7. The method of claim 6, wherein the low-power state is a sleep state.

8. The method of claim 6, wherein the low-power state is a power-down state.

9. The method of claim 1, wherein preventing the first radio from communicating in the first frequency band during the one or more portions of the future time interval to reduce the actual interference comprises:

switching the first radio from an active state to a low-power state to stop a communication in the first frequency band with the networking device; and operating the second radio of the plurality of radios of the ML device to resume the communication with the networking device in a second frequency band.

10. The method of claim 9, wherein the low-power state is a sleep state.

11. The method of claim 9, wherein the low-power state is a power-down state.

12. The method of claim 9, further comprising:

operating the first radio to send, to the networking device, a message indicating that the ML device is switching from the first frequency band to the second frequency band, wherein the message causes the networking device to communicate with the ML device in the second frequency band.

13. The method of claim 1, wherein the first radio of the plurality of radios of the ML device communicates in the first frequency band using WiFi technology and the different radio of the communication device communicates in the first frequency band using Bluetooth technology.

14. The method of claim 1, further comprising:

calculating the switching time to switch from the first radio of the plurality of radios to the second radio of the plurality of radios.

15. A multi-link (ML) device, comprising:

a plurality of radios; and one or more processors coupled to the plurality of radios, the one or more processors configured to:

operate a first radio of the plurality of radios to communicate in a first frequency band with a networking device;

determine a future time interval for a different radio of a communication device to communicate in the first frequency band;

determine a potential interference or an actual interference between the first radio of the plurality of radios and the different radio based on the future time interval of the different radio;

prevent the first radio from communicating in the first frequency band during one or more portions of the future time interval to reduce the potential interference or the actual interference;

determine a second potential interference or a second actual interference between the first radio of the plurality of radios and the different radio based on a second future time interval of the different radio;

determine whether the second future time interval is less than or greater than a switching time to switch from the first radio of the plurality of radios to a second radio of the plurality of radios; and either:

switch from the first radio to the second radio responsive to determining that the second future time interval is greater than the switching time, or prevent the switching from the first radio to the second radio responsive to determining that the second future time interval is less than the switching time.

16. The ML device of claim 15, wherein the one or more processors further configured to:

receive, from the communication device, activity data indicative of at least one of a future transmission by the communication device in the first frequency band, wherein determining the future timing interval is further based on the activity data.

17. The ML device of claim 15, wherein the first radio of the plurality of radios and the different radio are each coupled to a shared resource for communicating in the first frequency band, and wherein to determine the potential interference, the one or more processors further configured to:

determine a future time interval for the first radio of the ML device to communicate in the first frequency band; and determine a partial or complete overlap of the future time interval for the first radio and the future time interval for the communication device.

18. The ML device of claim 15, wherein the first radio of the plurality of radios of the ML device and the different radio are simultaneously communicating in the first frequency band.

19. The ML device of claim 15, wherein to determine the actual interference, the one or more processors further configured to:

determine that at least one of a first received signal strength indicator (RSSI) of the first radio is less than a first predetermined threshold value or a second RSSI of the different radio is less than a second predetermined threshold value while the first radio and the different radio are simultaneously communicating in the first frequency band.

20. The ML device of claim 19, wherein the one or more processors further configured to:

determine that the actual interference is no longer present by determining that the first RSSI of the first radio is greater than the first predetermined threshold value and the second RSSI of the different radio is greater than the second predetermined threshold value;

switch the first radio from low-power state to an active state; and operate the first radio to send, to the networking device, an additional message indicating that the ML device is switching from a second frequency band to the first frequency band, wherein the additional message causes the networking device to communicate with the ML device in the first frequency band.

21. The ML device of claim 20, wherein the low-power state is a sleep state.

22. The ML device of claim 20, wherein the low-power state is a power-down state.

23. The ML device of claim 15, wherein to prevent the first radio from communicating in the first frequency band during the one or more portions of the future time interval to reduce the actual interference, the one or more processors further configured to:

switch the first radio from an active state to a low-power state to stop a communication in the first frequency band with the networking device; and operate the second radio of the plurality of radios of the ML device to resume the communication with the networking device in a second frequency band.

24. The ML device of claim 23, wherein the low-power state is a sleep state.

25. The ML device of claim 23, wherein the low-power state is a power-down state.

26. The ML device claim 23, wherein the one or more processors further configured to:

operate the first radio to send, to the networking device, a message indicating that the ML device is switching from the first frequency band to the second frequency band, wherein the message causes the networking device to communicate with the ML device in the second frequency band.

27. The ML device of claim 15, wherein the first radio of the plurality of radios of the ML device communicates in the first frequency band using WiFi technology and the different radio of the communication device communicates in the first frequency band using Bluetooth technology.

28. The ML device of claim 15, wherein a system on chip (SOC) comprise the ML device and the communication device.

29. The ML device of claim 15, wherein the one or more processors further configured to:

calculate the switching time to switch from the first radio of the plurality of radios to the second radio of the plurality of radios.

30. A system on chip (SOC) device, comprising:

a multi-link (ML) module comprising a plurality of radios, and a processor coupled to the plurality of radios; and a communication module comprising a different radio;

wherein the processor configured to:

operate a first radio of the plurality of radios to communicate in a first frequency band with a networking device;

determine a future time interval for the different radio of the communication module to communicate in the first frequency band;

determine a potential interference or an actual interference between the first radio of the plurality of radios and the different radio based on the future time interval of the different radio;

prevent the first radio from communicating in the first frequency band during one or more portions of the future time interval to reduce the potential interference or the actual interference;

determine a second potential interference or a second actual interference between the first radio of the plurality of radios and the different radio based on a second future time interval of the different radio;

determine whether the second future time interval is less than or greater than a switching time to switch from the first radio of the plurality of radios to a second radio of the plurality of radios; and either:

switch from the first radio to the second radio responsive to determining that the second future time interval is greater than the switching time, or prevent the switching from the first radio to the second radio responsive to determining that the second future time interval is less than the switching time.

* * * * *